US009533471B2

(12) United States Patent
Di Campli

(10) Patent No.: US 9,533,471 B2
(45) Date of Patent: Jan. 3, 2017

(54) ECONOMICAL GLASS IMAGE ENCAPSULATION PROCESS

(76) Inventor: Roberto Di Campli, Doral, FL (US)

(*) Notice: Subject to any disclaimer, the term of this patent is extended or adjusted under 35 U.S.C. 154(b) by 559 days.

(21) Appl. No.: 13/347,781

(22) Filed: Jan. 11, 2012

(65) Prior Publication Data

US 2013/0174967 A1    Jul. 11, 2013

(51) Int. Cl.
B32B 17/10    (2006.01)

(52) U.S. Cl.
CPC ... B32B 17/10807 (2013.01); B32B 17/10018 (2013.01); B32B 17/10275 (2013.01); B32B 17/10788 (2013.01)

(58) Field of Classification Search
CPC .................. B32B 17/10018; B32B 17/10266; B32B 17/10275; B32B 17/102684
USPC ....................................... 156/99–109
See application file for complete search history.

(56) References Cited

U.S. PATENT DOCUMENTS

| | | | |
|---|---|---|---|
| 4,173,672 A * | 11/1979 | Mannheim | .................... 428/203 |
| 4,285,716 A | 8/1981 | Honjo | |
| 5,019,440 A * | 5/1991 | Ogasawara et al. | ....... 428/195.1 |
| 5,669,951 A | 9/1997 | Eichhorn | |
| 6,113,679 A * | 9/2000 | Adkins et al. | ............... 106/31.6 |
| 6,773,537 B2 | 8/2004 | Erickson | |
| 6,797,324 B2 | 9/2004 | Pollara | |
| 6,805,932 B2 | 10/2004 | Stickrod | |
| 6,984,429 B2 | 1/2006 | Thurnston | |
| 7,311,956 B2 | 12/2007 | Pitzen | |
| 7,544,390 B2 | 6/2009 | Zax | |
| 7,976,906 B2 | 7/2011 | Eron | |
| 2002/0160680 A1* | 10/2002 | Laurence et al. | ............. 442/394 |
| 2007/0122633 A1* | 5/2007 | Pesek et al. | .................. 428/442 |
| 2007/0154632 A1 | 7/2007 | Schaefer | |
| 2011/0081551 A1 | 4/2011 | Koops | |
| 2011/0209634 A1 | 9/2011 | Sabia | |

* cited by examiner

Primary Examiner — Christopher Schatz
(74) Attorney, Agent, or Firm — Ruben Alcoba, Esq.

(57) ABSTRACT

An economical glass image encapsulation process that encapsulates an image between a single plate of glass and a flexible, adhesive sheet of ethylene vinyl acetate. Application of varying thermodynamic parameters to the plate of glass in a vacuum oven increases the glass' absorbency to ink from the image, without relying on the traditional high temperature ovens or tempering machines. The economical glass image encapsulation process eliminates multiple steps, equipment, and components traditionally utilized for image encapsulation such as the need for: high temperature heaters, tempering machines, a second plate of glass, extra adhesive sheets of polymers, multiple superfluous steps for cutting the plate of glass, and shipping costs for whole plates of glass.

1 Claim, 4 Drawing Sheets

ECONOMICAL GLASS IMAGE ENCAPSULATION PROCESS

BACKGROUND

The present invention is directed to an economical glass image encapsulation process that encapsulates an image between a single plate of glass and an adhesive sheet of ethylene vinyl acetate to eliminate the need for multiple steps and equipment associated with traditional glass image encapsulation.

The inventor of the present invention has worked in the glass production and imaging industry for over twenty years. He has encapsulated images into glassware of all dimensions and designs for his clients. When encapsulating images, he has used or witnessed in the industry, myriad procedures that include: organic ultraviolet inks, sophisticated interlayer patterns created with complex algorithms, scratch resistant glassware, different compositions of laminate for the glass, and numerous other innovative concepts.

The inventor was very familiar with his industry's traditional process for encapsulate images in glass. In the traditional process, a digital image is first printed on a thin sheet of adhesive material, creating a decorative interlayer. The decorative interlayer is sandwiched between two adhesive sheets of film, which are themselves sandwiched between two plates of glass. The process next requires ink from the image to be fixed on the glass by setting the glass in a special dryer. The dryer causes the solvents from the ink to evaporate, thereby leaving only ink on the glass. The evaporation process continues and the glass is made more absorbent for ink by heating the glass up to 1000 degrees in a high temperature oven. The high temperature is efficacious in increasing the absorbency of the glass to the ink. Next, the glass is tempered, or quenched, to cool the glass. If the glass is not tempered, cracks and bubbles can form due to the chemical nature of Silica (SiO2, chief element of glass). The tempering machine is very expensive and requires a high skill set to operate. The inventor recognized that this traditional image encapsulating process was time consuming and required great capital expenditure.

Over the years, the inventor encountered numerous difficulties, and noted many problems with the traditional image encapsulation process. Even derivations of the image encapsulation process contained these same problems. The chief issue was the high cost of encapsulating images on glass. For example, the tempering machine, used to cool the glass, could cost up to a million dollars. Another expense that the inventor thought was superfluous was the use of two plates of glass. He wondered if the encapsulation process could be accomplished with only one plate of glass. Also, whenever the glass was removed from the high temperature oven, bubbles and cracks resulted, which obviated the whole glass. This waste added to the cost of the process. Even after the glass was completed, the cutting and shipping procedures seemed arduous and inefficient in the traditional glass image encapsulation process.

Other problems that the inventor wished to solve included the fact that cutting the plate of glass encapsulated with an image required multiple steps because of the thickness of the two plates of glass and multiple films of adhesive. The traditional approach required: cutting a first plate of glass on one side, flipping the glass over, cutting the second plate of glass, and then finally, cutting the adhesive films between the glass. Another problem was the costs associated with shipping glass with images. The industry standard was to ship the whole glass after the image was encapsulated on it. This shipments of plates of glass was not only heavy and expensive, but the glass often cracked during shipping. The inventor started to conceptualize how he could eliminate some of these superfluous steps, wasted materials, and shipping costs associated with the traditional glass image encapsulation process.

Through past research and knowledge of the chemical industry, the inventor was aware of a flexible, adhesive polymer that possessed high clinginess characteristics, which he realized would be conducive to retaining ink solvents of the image. The polymer was ethylene vinyl acetate (known in the industry as "EVA"), and was available as a flexible, thin sheet that could easily be cut into any desired dimension. With trial and error, the inventor was able to embed digital images onto the ethylene vinyl acetate from a simple flat bed printer. This initial printing process was more economical than digital printing on the plate of glass. The inventor realized that perhaps he did not have to embed the digital images on the plate of glass if the glass would accept the ethylene vinyl acetate with the embedded image instead. However, he still had to make the glass more receptive to the image on the sheet of ethylene vinyl acetate.

Because the inventor worked in the glass industry for many years, he was aware that cerium oxide was efficacious for polishing and removing scratches from glass. He realized that if he was to have any success, he should start out with the cleanest plate of glass possible. So he first washed the plate of glass with a detergent mix of cerium oxide and water. After trial and error, he discovered that the glass polished better with cerium oxide and hot deionized water, rather than regular fresh water. After the inventor washed the plate of glass, the glass appeared more receptive to acquiring the image on the sheet of ethylene vinyl acetate.

The inventor then adhered the printed sheet of ethylene vinyl acetate onto the freshly washed, single plate of glass. However, he realized that the sheet of ethylene vinyl acetate was too exposed, and would be better served with a protective layer covering it. The inventor utilized a protective coating of silicone paper as a separator, which he placed on top of the sheet of ethylene vinyl acetate. After trial and error, the inventor further realized that the protective coating created a more accurate encapsulation of the image, since slippage was prevented. The inventor recognized that one of the problems was close to being resolved. Now, images could be shipped on the sheet of ethylene vinyl acetate, which could then be placed on the glass at the final destination, rather than shipping the whole plate of glass with the image encapsulated on it. Despite these new processes, the inventor still recognized that he had to create the right environment for the glass to fully accept the image from the sheet of ethylene vinyl acetate.

This last step is where the industry had difficulties in the past, and where most of the expenses originated. The inventor began to research ways to make silica more absorbent, that did not include very high temperatures. He realized that if he could find a way to do this, he could eliminate the two most expensive steps of the image encapsulating process—heating and tempering. His research led him to scholarly articles in journals such as *Philosophical Magazine*, "The effect of environment on silica fractures: vacuum, carbon monoxide, water, and nitrogen", and "pH hysteresis effect with silica capillaries in capillary zone electrophoresis" by William Lambert. He also studied a host of other scientific articles found on web sites, like: http://prb.aps.org/abstract/PRB/v59/i6/p4066_1, and http://www.sciencedirect.com/science/article/pii/S1381116998001733.

He pieced this information together and, over time, recognized that a vacuum oven would create the right absorbency environment for the glass. Through trial and error, he programmed some basic thermodynamic parameters into a vacuum oven. He then performed the following steps after placing the plate of glass in the vacuum oven: preset the vacuum oven to an atmospheric pressure of 1110 millibars, set the temperature to 130 degrees Celsius, heat the plate of glass for 60 minutes, and maintain the temperature for 10 minutes. The inventor finally let the plate of glass cool down for 20 minutes at room temperature. Since the finished product comprised of only one plate of glass, the inventor only had to make one simple cut on one side of the glass to create the desired dimensions. This was another problem resolved, as he did not have to perform multiple cuts from both sides of the encapsulated glass, like before. The inventor was now able to perform his new glass image encapsulating process for a fraction of the cost of the traditional process.

However, the inventor reviewed marketing material, and realized that many consumers preferred a dark background to the images in the glass. To achieve a more opaque look, he added a layer of paint over the silicone paper separator after removing the plate of glass from the vacuum oven. By performing this additional step, he could adjust the darkness behind the image. The darker the paint, the less translucent the plate of glass became.

Glass image encapsulating processes have been utilized in the past; yet none with the present cost reducing characteristics of the present invention, See U.S. Pat. No. 7,544,390; U.S. Pat. No. 5,019,440; U.S. Pat. No. 7,311,956; and 2011/0209634.

For the foregoing reasons, there is an economical glass image encapsulation process that eliminates the need for expensive ovens and tempering machines, eliminates steps for cutting glass, reduces shipping costs, and allows more artists to enter the field of glass imaging.

SUMMARY

The present invention is directed to an economical glass image encapsulation process that encapsulates an image between a single plate of glass and a flexible, adhesive sheet of ethylene vinyl acetate. Applying varying thermodynamic parameters to the plate of glass in a vacuum oven increases the glass' absorbency to ink from an image, without relying on the traditional high temperature ovens or tempering machines. The economical glass image encapsulation process eliminates multiple steps, equipment, and components traditionally utilized for image encapsulation such as the need for: high temperature heaters, tempering machines, a second plate of glass, extra adhesive sheets of polymers, multiple steps for cutting the plate of glass, and shipping costs for whole plates of glass.

The present invention is an economical glass image encapsulation process that reduces costs, equipment, and components used in the traditional glass image encapsulation process. The initial step of the economical glass image encapsulation process requires the plate of glass to be washed in a chemical mixture of cerium oxide and deionized water. This enhances the receptivity of the plate of glass to ink and removes any imperfections resulting from production. An image is then placed on the sheet of ethylene vinyl acetate. This image can be applied from a simple, inexpensive flat bed printer. This eliminates the need to print an image on glass, often with expensive digital printers or ultraviolet inks. A sheet of protective coating—in one embodiment, silicone paper is then applied over the sheet of ethylene vinyl acetate for a more accurate encapsulation of the image onto the plate of glass. The sheet of protective covering prevents slippage between the image on the sheet of ethylene vinyl acetate and the plate of glass. The absorbency of the plate of glass is enhanced by placing the plate of glass in a vacuum oven and manipulating thermodynamic parameters such as time, temperature, and pressure inside the vacuum oven. The thermodynamic parameters generated inside the vacuum oven act on the chemical composition of the plate of glass to create a more absorbent medium for the images on the sheet of ethylene vinyl acetate. Finally, for an increased darkness behind the image, it is possible at this stage of the process to apply a layer of paint on top of the protective coating. A darker layer of paint will reduce translucency, resulting in a darker background for the image.

The thermodynamic parameters are set as follows: the vacuum oven must initially be preset to an atmospheric pressure of 110 millibars. After the plate of glass is positioned inside the vacuum oven, the temperature is set to 130 degrees Celcius for 60 minutes. The temperature is then maintained for 10 minutes more. Finally, the finished plate of glass is removed and allowed to cool at room temperature. The time, temperature, and pressure manipulation process eliminates the need for a high temperature heater and a tempering machine.

The cooled plate of glass can then be cut to the desired dimensions with a single cut. Since the economical glass image encapsulation process utilizes only one plate of glass, the need to make multiple cuts is eliminated. Furthermore, the finished sheet of ethylene vinyl acetate with the image embedded on it can be shipped to another location that utilizes the economical glass image encapsulation process, thereby eliminating the need to ship the heavier, more fragile plate of glass.

An object of the present invention is to drastically reduce the cost of encapsulating an image on a plate of glass by eliminating multiple steps, equipment, and components traditionally utilized for image encapsulation such as the need for: high temperature heaters, tempering machines, a second plate of glass, extra adhesive sheets of polymers, multiple steps for cutting the plate of glass, and glass shipping costs; thereby providing easier access for more artists to entering the industry of glass image encapsulation.

Another object of this invention is to reduce the amount of steps needed to cut the plate of glass because only one plate of glass is utilized.

Yet another object of this invention is to reduce shipping costs because only a sheet of ethylene vinyl acetate with an embedded image needs to be shipped to a location that utilizes the economical glass image encapsulation process, rather than shipping the complete plate of glass.

Yet another object of this invention is to reduce the cost of glassware that contains images such as: stained glass, arts and crafts, shower doors, kitchen cabinets, office décor, glass tile, and other glassware of similar extrusion.

DRAWINGS

These and other features, aspects, and advantages of the present invention will become better understood with regard to the following description, appended claims, and drawings where:

DESCRIPTION

Figure 1:
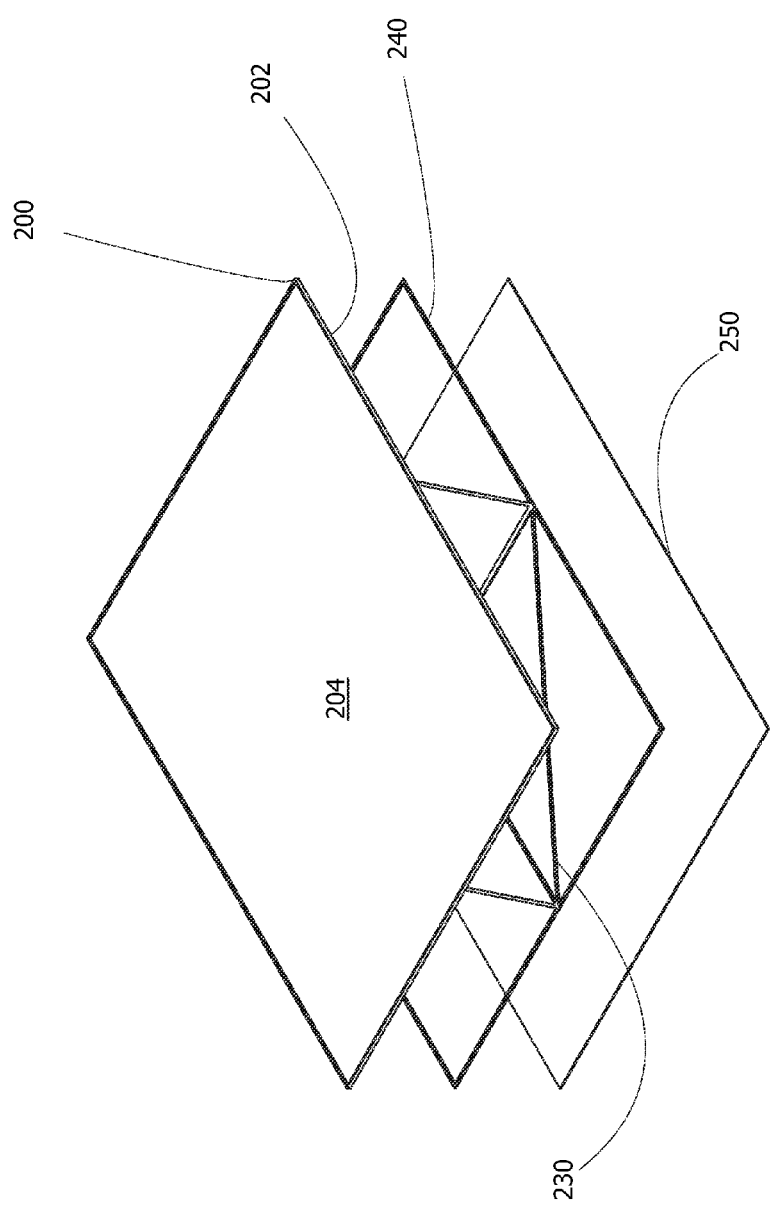
FIG. 1 is a perspective view of the present invention.
Figure 2:
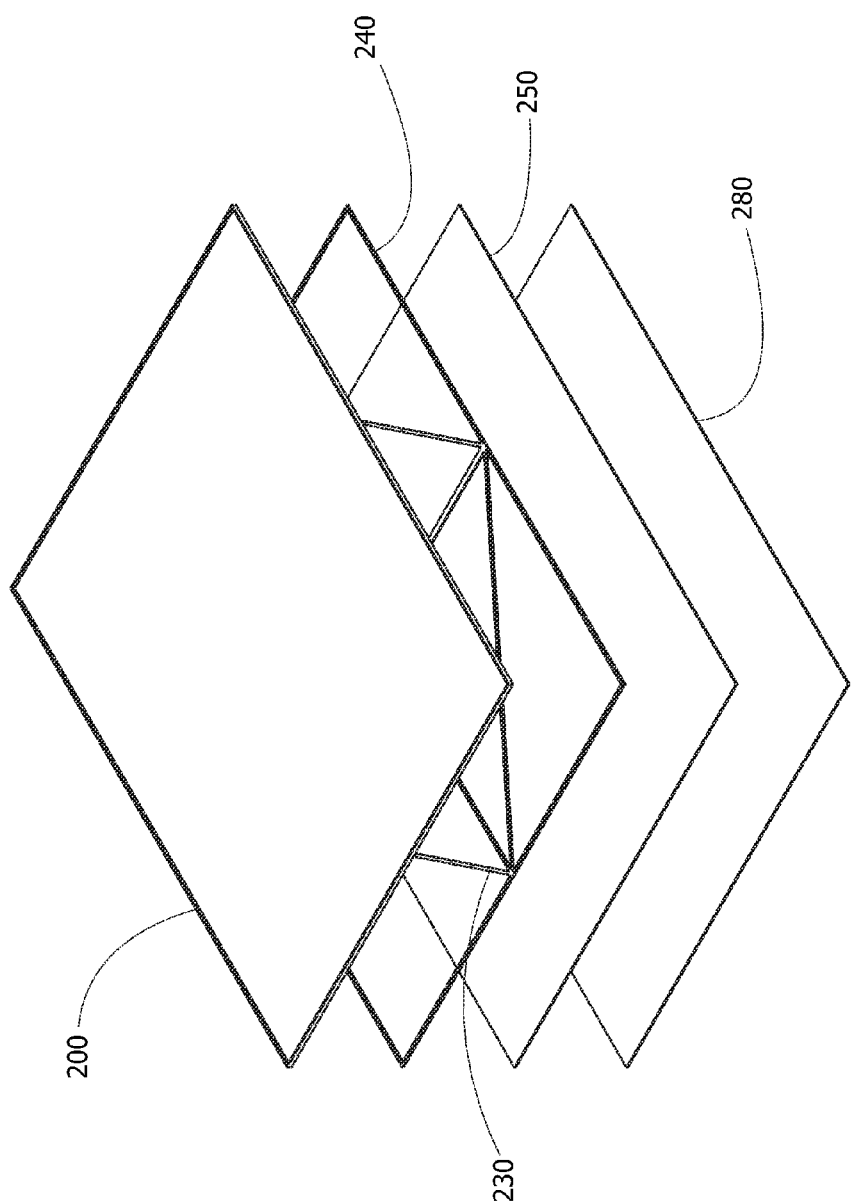
FIG. 2 is a perspective view of the present invention with an added layer of paint.
Figure 3:
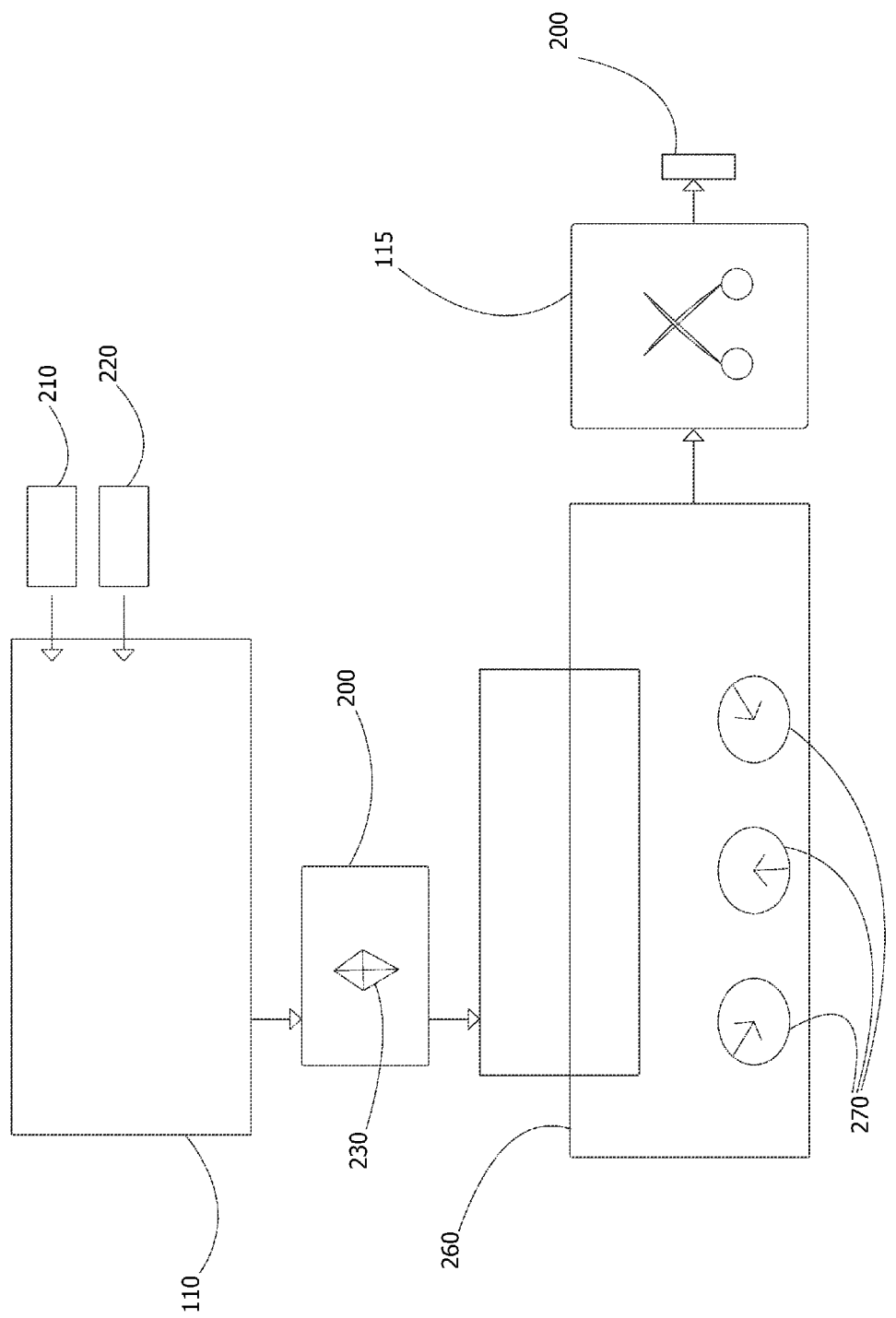
FIG. 3 is a schematic diagram of the economical glass image encapsulation process.
Figure 4:
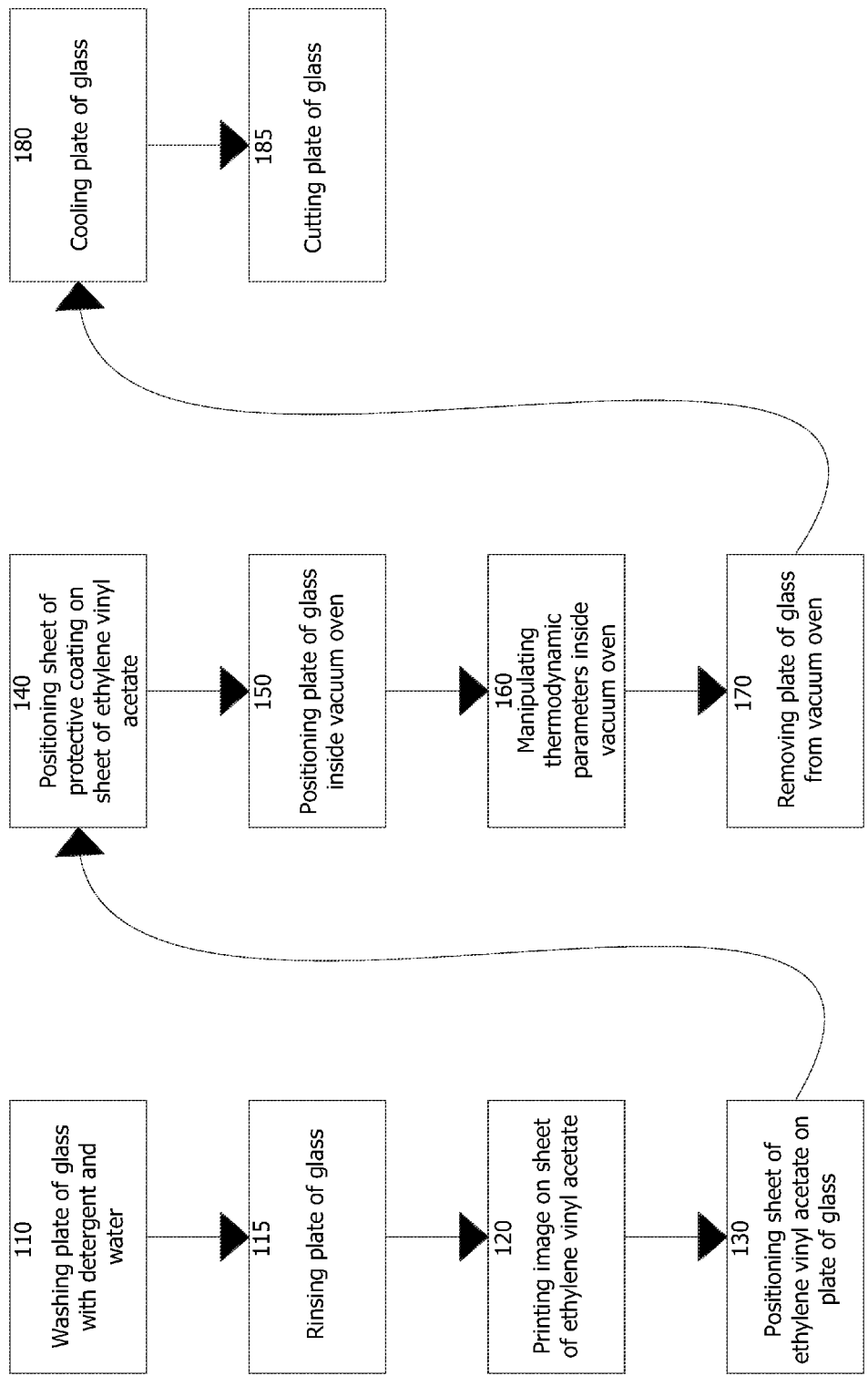
FIG. 4 is a block diagram of the economical glass image encapsulation process.

One embodiment of the economical glass image encapsulation process 100 is illustrated in FIGS. 1-4. The economical glass image encapsulation process 100 is used to encapsulate an image 230 between a single plate of glass 200 and an adhesive sheet of ethylene vinyl acetate 240 to eliminate the need for multiple steps and equipment associated with traditional glass image encapsulation. Furthermore, application of varying thermodynamic parameters 270 to the plate of glass 200 in a vacuum oven 260 increases the plate of glass 200 absorbency to ink from an image 230, without relying on traditional high temperature ovens or tempering machines. The economical glass image encapsulation process 100 comprises the following steps, which represent a drastic reduction in cost from the traditional process for glass image encapsulation. A first step 110 is necessary by washing the plate of glass 200 in a detergent 210. In one preferred embodiment, the detergent 210 comprises cerium oxide and deionized water. Cerium oxide is efficacious in polishing and removing scratches from glass, while the deionized water acts to dilute the concentrated effects of cerium oxide. The plate of glass 200 has a first planar surface 202 where most of the economical glass image encapsulation process 100 occurs, and a second planar surface 204, representing the outside visible side of the plate of glass 200. The second step 115 of the economical glass image encapsulation process 100 comprises rinsing the plate of glass 200 with a predetermined quantity of water 220. Deionized water is the preferred embodiment because, with the heat applied later on in the economical glass image encapsulation process 100, fresh water can leave dirt and residue on the plate of glass 200. A third step 120 includes the important action of printing at least one image 230 on a sheet of ethylene vinyl acetate 240. This can be accomplished with a simple flat bed printer. The third step allows the relatively lightweight and durable sheet of ethylene vinyl acetate 240 to be shipped to a location where the economical glass image encapsulation process 100 can continue. This is drastically more cost effective than shipping the plate of glass 200 with a completed image 230 because the sheet of ethylene vinyl acetate 240 is more lightweight, flexible, and durable than a plate of glass 200. A fourth step 130 includes positioning the sheet of ethylene vinyl acetate 240 on the first planar surface 202 of the plate of glass 200, whereby the image 230 is oriented to a desired final visibility. The next step, a fifth step 140, includes positioning a sheet of protective coating 250 on the sheet of ethylene vinyl acetate 240. The preferred embodiment for the sheet of protective coating 250 is silicone paper. The sheet of protective coating 250 creates more accurate encapsulation by preventing slippage between the sheet of ethylene vinyl acetate 240 and the plate of glass 200. A sixth step 150 of the economical glass image encapsulation process 100 involves positioning the plate of glass 200 in a vacuum oven 260. The vacuum oven is the most expensive component utilized in the economical glass image encapsulation process 100. A seventh step 160 involves manipulating a plurality of thermodynamic parameters 270 in the vacuum oven 260, whereby the plate of glass 200 is made more capable of absorbing the images 230. The thermodynamic parameters 270 generated inside the vacuum oven 260 are time, temperature, and pressure. The thermodynamic parameters 270 act on the chemical composition of the plate of glass 200 to become a more absorbent medium for the images 230 embedded on the sheet of ethylene vinyl acetate 240. In one embodiment, the thermodynamic parameters 270 are set as follows: the vacuum oven 260 must initially be preset to an atmospheric pressure of 1110 millibars. After the plate of glass 200 is positioned inside the vacuum oven 260, the temperature is set to 130 degrees Celsius for 60 minutes. The temperature is then maintained for 10 minutes more. Finally, the finished plate of glass 200 is removed and allowed to cool at room temperature. The time, temperature, and pressure manipulation process eliminates the need for a high temperature heater and a tempering machine, as is required in the traditional glass image encapsulation process. This results in a drastic reduction in costs. For example, the tempering machine itself can cost over a million dollars. The eighth step 170 of the economical glass image encapsulation process 100 involves removing the plate of glass 200 from the vacuum oven 260. The ninth step 180 is to cool the plate of glass 200 for a predetermined quantity of time. In one embodiment, the time is 20 minutes at room temperature. Clearly, this is much more cost effective than bringing the plate of glass down from 1000 degrees Celsius. A final, tenth step 185 involves cutting the plate of glass 200 to a desired dimension. The cut is made easily on one side of the plate of glass 200, without having to the plate of glass over and cut a second plate of glass, or cut multiple layers of adhesive between the glass. In another embodiment, a further step comprises of further applying a layer of paint 280 on top of the sheet of protective coating 250, the layer of paint is added to increase darkness behind the image. A darker layer of paint 280 will reduce translucency, resulting in a darker background for the image 230.

The finished plate of glass 200 is transformed into a high quality decorative glass piece that matches any other in the industry for durability and construction; yet is significantly more cost effective. The economical glass image encapsulation process 100 is also simpler and more fool proof since the encapsulation is only made on one side of a single plate of glass 200. Further, any client provided with the sheet of ethylene vinyl acetate 240 having the image 230 embedded in it along with the simple steps, can apply the economical glass image encapsulation process 100 quickly and cost effectively. The economical glass image encapsulation process 100 can be applied in a variety of product applications such as: stained glass, arts and crafts, shower doors, kitchen cabinets, office décor, glass tile, ceilings, and other glassware of similar extrusion.

An advantage of the present invention is that it drastically reduces the cost of encapsulating an image on a plate of glass by eliminating multiple steps, equipment, and components traditionally utilized for image encapsulation such as the need for high temperature heaters, tempering machines, a second plate of glass, extra adhesive sheets of polymers, multiple superfluous steps for cutting the plate of glass, and glass shipping costs; thereby providing easier access for more artists to entering the industry of glass image encapsulation.

Another advantage of the present invention is that it reduces the number of steps needed to cut the plate of glass because only one plate of glass 200 is utilized, rather than the traditional utilization of two plates of glass with multiple adhesives in between the glass.

Yet another advantage of the present invention is the reduction in shipping costs because only a lightweight, durable sheet of ethylene vinyl acetate 240 containing an embedded image 230 needs to be shipped to a location that utilizes the economical glass image encapsulation process 100, rather than shipping the complete plate of glass 200.

Yet another advantage of the present invention is that it reduces the cost of glassware with images.

Thus the reader will see that economical glass image encapsulation process 100 provides a more efficient, economical solution for encapsulating glass with images.

While the inventor's above description contains many specificities, these should not be construed as limitations on the scope, but rather as an exemplification of several preferred embodiments thereof. Many other variations are possible. For example, the economical glass image encapsulation process 100 could utilize different thermodynamic parameters 270 inside the vacuum oven 260 for different grades of ink or different styles of images 230. Accordingly, the scope should be determined not by the embodiments illustrated, but by the appended claims and their legal equivalents.

What is claimed is:

1. An economical glass image encapsulation process for doing away with the need for multiple plates of glass in the lamination process and reducing a plurality of steps and using only one single plate of glass during the process of image encapsulation on glass, the economical glass image encapsulation process consisting of:

selecting a single plate of glass that will be only used for the entire lamination process;

a first step of washing the plate of glass in a detergent, the plate of glass having a first planar surface, the plate of glass further having a second planar surface;

a second step of rinsing the plate of glass with a predetermined quantity of water;

a third step of printing at least one image on a sheet of ethylene vinyl acetate;

a fourth step of positioning the sheet of ethylene vinyl acetate on the first planar surface of the plate of glass, whereby the at least one image is oriented to a desired visibility a fifth step of positioning a sheet of protective coating on the sheet of ethylene vinyl acetate;

a sixth step of positioning the plate of glass in a vacuum bag inside a vacuum oven;

a seventh step of manipulating a plurality of thermodynamic parameters in the vacuum oven, whereby the plate of glass is made more capable of absorbing the at least one image; an eighth step of removing the plate of glass from the vacuum oven;

a ninth step of cooling the plate of glass for a predetermined quantity of time; and a tenth step of cutting the plate of glass to a desired dimension.

* * * * *